United States Patent
Constanti

Patent Number: 5,822,178
Date of Patent: Oct. 13, 1998

[54] ELECTROLYTIC CAPACITOR AND METHOD FOR MANUFACTURE THEREOF

[75] Inventor: Jean Constanti, Poissy, France

[73] Assignee: Becromal S.p.A., Rozzano Mi, Italy

[21] Appl. No.: 615,085

[22] Filed: Mar. 14, 1996

Related U.S. Application Data

[63] Continuation of Ser. No. 214,134, Mar. 16, 1994, abandoned.

[30] Foreign Application Priority Data

Mar. 18, 1993 [EP] European Pat. Off. ............ 93104399

[51] Int. Cl.[6] ............................. H01G 9/04; H01G 9/145
[52] U.S. Cl. .................. 361/523; 29/25.03; 361/524; 361/528; 361/529; 361/532; 361/534; 429/251; 429/254
[58] Field of Search ................... 428/457, 458, 428/461, 315.9, 317.1, 318.4; 361/508, 509, 528, 529, 523, 524, 532, 534; 429/188, 193, 247, 251, 254; 29/25.03

[56] References Cited

U.S. PATENT DOCUMENTS

| | | | |
|---|---|---|---|
| B 280,395 | 1/1975 | Alwitt et al. | |
| 3,656,027 | 4/1972 | Isley | 317/230 |
| 3,657,644 | 4/1972 | Beam et al. | 324/61 R |
| 3,928,705 | 12/1975 | Loft et al. | 428/311 |
| 4,764,181 | 8/1988 | Nakano et al. | |
| 4,913,930 | 4/1990 | Getson | 428/906 X |
| 4,939,235 | 7/1990 | Harvey et al. | 528/337 |
| 5,047,283 | 9/1991 | Leatherman et al. | 428/323 X |
| 5,354,593 | 10/1994 | Grandmont et al. | 428/457 X |

FOREIGN PATENT DOCUMENTS

| | | |
|---|---|---|
| 0 022 719 | 1/1981 | European Pat. Off. |
| 27 41 178 | 3/1978 | Germany. |

*Primary Examiner*—James J. Bell
*Assistant Examiner*—Blaine R. Copenheaver
*Attorney, Agent, or Firm*—Wenderoth, Lind & Ponack

[57] ABSTRACT

A metal tape is employed to form electrodes for an electrolytic capacitor. At least one side surface of the metal tape has rigidly adhered thereto a separating sheet of microporous thermoplastic material. This preferably is done by a thermal process or by cementing. Both surfaces of the metal tape, for example formed of aluminum, may have separating sheets applied thereto. Selected regions of such surface or surfaces may be maintained uncoated, whereby subsequent use as electrodes may enable the attachment to such uncoated regions of terminal contacts.

26 Claims, 1 Drawing Sheet

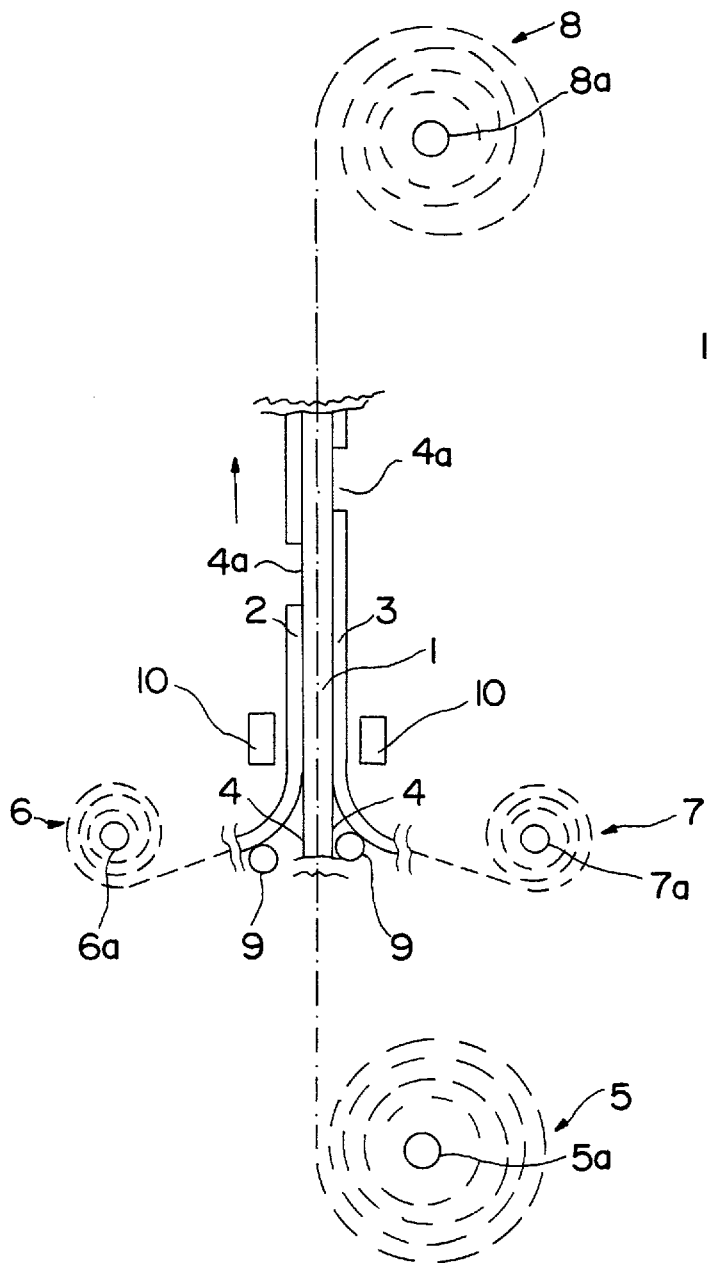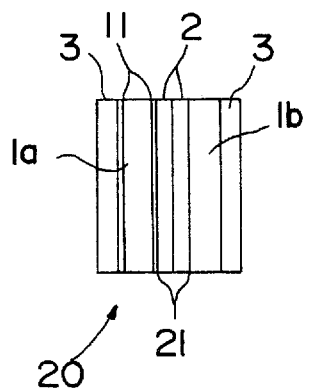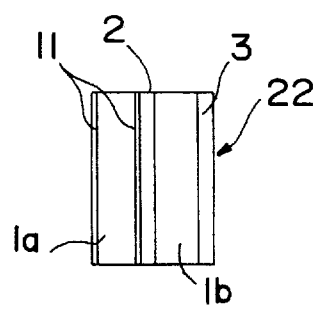
FIG. 1
FIG. 2
FIG. 3

ELECTROLYTIC CAPACITOR AND METHOD FOR MANUFACTURE THEREOF

This application is a continuation of U.S. Ser. No. 08/214,134, filed Mar. 16, 1994, now abandoned.

BACKGROUND OF THE INVENTION

The present invention relates to an improved electrolytic capacitor employing a metal tape, preferably an aluminum tape, the metal tape having opposite side surfaces and a thickness between such surfaces of from approximately 5 μm to approximately 300 μm. Further, the present invention is directed to a process for manufacture or formation of such improved metal tape.

It is known to use metal electrodes of such thickness in conventional capacitors. Such electrodes normally are separated from each other electrically by a layer of paper or a plastic sheet. However, the manufacture of capacitors having such structure and employing such separate separating layer is expensive in view of the manipulation of such separate elements. Furthermore, the use of three such separate elements, i.e. the necessary two such electrodes and the separating layer, results in the capacitor formed thereby having a relatively large volume for the capacitance achieved thereby. Moreover, the impedance, reactance and effective conductance of such conventionally formed capacitor is not always satisfactory.

SUMMARY OF THE INVENTION

Accordingly, it is an object of the present invention to provide an improved electrolytic capacitor of the above type, whereby such capacitor can be fabricated simply and economically and to have improved electric properties.

It is a further object of the present invention to provide a process for the manufacture or formation of such improved electrolytic capacitor.

It is a still further object of the present invention to provide such improved electrolytic capacitor and such process whereby it is possible to overcome the above and other prior art disadvantages.

The above objects are achieved in accordance with the present invention by providing that at least one side surface of the metal tape has rigidly adhered thereto a coating layer of a sheet or web of microporous thermoplastic material. By this novel feature according to the present invention it is possible to provide simple and economical production of electrolytic capacitors equipped with improved electrodes, and specifically whereby it is possible to dispense with the need for provision and handling of the separate separating layer between the electrodes. Specifically, the coating layer according to the present invention is not provided as a separate part that must be manipulated during manufacture of the capacitor, but rather is a separating sheet that is connected rigidly to at least one of the electrodes. Accordingly, the thickness of the separating layer can be reduced so that the outer dimensions of the electrolytic capacitor for a particular capacitance can be reduced. Furthermore, the use of such metal tape to form the improved electrodes enable the electrolytic capacitors of the invention to have improved electric properties.

The sheet or web forming the microporous thermoplastic coating layer is applied to the surface of the metal tape preferably by a thermal process, further preferably by welding or cementing. One skilled in the art, upon consideration of the present disclosure, would understand the manner of achieving such coating employing available technology.

It is advantageous to provide both side surfaces of the metal tape, preferably aluminum tape, with respective sheets or webs forming microporous thermoplastic coating layers. Thereby it is possible to further improve the electric properties of the electrolytic capacitor, in particular the dielectric strength thereof.

According to an advantageous feature of the present invention, the surface or surfaces of the metal tape may include uncoated regions. That is, the adherence of the coating layer or layers to such surface or surfaces may be controllably interrupted at specified surface regions. Such uncoated surfaces may be used to form a terminal contact or contacts of the electrode. That is, terminal contacts can be affixed to the uncoated surface regions during production of the capacitor in a simple and easy manner by known connecting techniques, for example cold welding or ultrasonic welding techniques as would be understood by one skilled in the art.

During the production of such a metal tape the surfaces thereof conventionally are etched, resulting in surface pores. According to a further advantageous feature of the present invention, the pores of the microporous thermoplastic coating layer have approximately the same dimension as such surface pores. It particularly is contemplated that the diameter of such pores preferably is in a range of about 1.5 μm to 5 μm for all voltages. Thereby is ensured that only ionic contact and never physical contact occurs between the electrodes of the electrolytic capacitor. For low voltage in general and for electrolytic capacitors with a very low impedance the diameter of the pores should be less than 500 μm. One of ordinary skill in the art would understand from the present disclosure what types of thermoplastic materials could be employed to form the coating layer. It is contemplated that in accordance with the present invention advantageous materials for such thermoplastic coating layer may be polyethylene, polypropylene, polyester, polytetrafluoroethylene, polycarbonate, polyamide 6, polyethyleneterephthalate, polyethylene isophthalate, or a copolymer of the two last substances.

A process for the formation or manufacture of the metal tape involves, after the final step in formation of the metal band itself, rigidly adhering to at least one surface of the metal band a sheet or web forming the coating layer of microporous thermoplastic material. This preferably is done by a thermal process, such as welding, or cementing.

In accordance with an advantageous feature of the process of the invention, the coated metal tape after coating thereof can be rolled or wound to form a supply roll thereof. The thickness and porosity of the coating layer during formation thereof can be controlled or adjusted by regulation or control of such winding operation. In particular, the sheet or web of the coating layer material can be stretched via control of the relative speeds of the metal tape with respect to the sheet or web to be applied. As a result, it is possible to provide a layer of regulated low thickness and with a regulated desired porosity.

The electrode of the electrolytic capacitor of the present invention employs the improved metal tape discussed above. Such electrode can be in the form of an anode and/or a cathode. By employing such electrodes in an electrolytic capacitor it is possible to optimize the electric properties of the electrolytic capacitor, the spatial dimensions thereof, and also the process of production thereof. The anode and/or the cathode each may be coated on one side surface thereof or on both side surfaces thereof. As discussed above, delimited regions of the surface may be maintained uncoated to form regions for attachment of terminal contacts in a simple and reliable manner. It has proven to be particularly advantageous if a counterelectrode has a coating layer in the region thereof adjacent and confronting the uncoated terminal region of another electrode.

BRIEF DESCRIPTION OF THE DRAWINGS

Other objects, features, advantages and possible applications of the invention will be apparent from the following detailed description of preferred features thereof, with reference to the accompanying drawings. It is to be understood that all described and/or illustrated features form by themselves or in any logical combination the subject matter of the invention, independently of their recitation in the claims and their illustration in the drawing. In the drawings:

FIG. 1 is a schematic elevation view illustrating features of the metal tape and the electrode formed thereby employed in the process of the present invention; and FIGS. 2 and 3 are schematic views of electrolytic capacitors produced according to the invention.

DETAILED DESCRIPTION OF THE INVENTION

Illustrated in FIG. 1 is a metal tape 1, for example an aluminum tape, formed by known procedures. In the illustrated arrangement, the tape is shown as being supplied in the form of a roll 5 from a spool 5a. Tape 1 has opposite side surfaces 4. Applied to surfaces 4 are respective coating layers 2, 3 of a microporous thermoplastic material. This may be done by, for example, supplying layers 2, 3 as foils, i.e. sheets or webs, from respective supply rolls 6, 7 on respective spools 6a, 7a. Other manners of supply will be apparent. The sheets or webs forming coating layers 2, 3 are rigidly connected, attached and adhered to respective surfaces 4. This preferably is done by a thermal process as would be understood by one skilled in the art from a consideration of the present disclosure. For example, an adhesive or cement may be applied to surfaces 4 or to coating layers 2, 3 by suitable applicators 9. One skilled in the art would be aware, from the present disclosure, what suitable cements or adhesives could be employed for given thermoplastic materials. The adherence of the coating layers to the surfaces 4 and/or curing of the adhesive or cement may be facilitated by suitable heaters 10. Alternatively, adherence of the coating layers to the surfaces could be achieved by fusing or welding by suitable thermal devices 10. One skilled in the art would understand from the present disclosure, suitable devices that could be employed as thermal elements 10 to achieve adherence, curing, fusing or welding in accordance with the present invention, for particular materials employed.

FIG. 2 shows schematically a capacitor 20 formed of two electrodes, i.e. anode 1a and cathode 1b, formed from the tape of FIG. 1. Each electrode includes the metal tape having on opposite side surfaces thereof separating sheets forming the coating layers 2, 3. Coating layers 2 of the two electrodes are in abutment to define the separating layer 21 of the electrolytic capacitor. Anode la has formed on the surfaces thereof, as is conventional and well known in the technology of electrolytic capacitors, oxide films 11 forming the dielectric of the electrolytic capacitor.

FIG. 3 shows schematically another electrolytic capacitor 22 formed of two electrodes formed from tapes in accordance with the present invention. The capacitor 22 differs from the capacitor 20 of FIG. 2 in that only a single separating sheet is between the two metal tapes 1. In the specific arrangement illustrated in FIG. 3, there is achieved by the application of one electrode formed in the manner illustrated in FIG. 1, i.e. having on opposite surfaces thereof separating sheets 2, 3, applied to another metal tape 1 having at least one surface not having adhered thereto a separating sheet. The arrangement of FIG. 3 alternatively could be formed by placing together two electrodes, each electrode comprising a metal tape 1 having applied to only one surface thereof a separating sheet 2 or 3.

The coating layers may be applied to the respective surfaces 4 region-by-region, i.e. to leave certain surface regions 4a uncoated. This enables such uncoated regions to subsequently have attached thereto terminal contacts. Thereby the electrodes, i.e. anodes and/or cathodes, formed from the coated metal tape may be employed for manufacture of electrolytic capacitors. The manufacture of such capacitors is facilitated by leaving regions 4a uncoated to enable easy attachment of terminal contacts to the electrodes. Furthermore, it will be apparent that the provision of coating layers 2, 3 enables formation of an electrolytic capacitor with basically two elements, i.e. the two necessary electrodes, rather than by the previously required three elements of the two necessary electrodes and a separate spacing layer. Therefore, manufacture of the capacitor is simplified. Additionally, dimensions of an electrolytic capacitor for achieving a given capacitance are reduced.

FIG. 1 illustrates schematically that the coated metal tape, after the operation of coating thereof, is wound as a supply roll 8, for example around a spool 8a. The thickness and porosity of the coating layers 2, 3 can be controlled or adjusted by regulating or controlling this winding operation. This can be done, for example, by control of the operation of spools 6a, 7a, 8a to achieve a regulated stretching of the sheets or webs forming the coating layers, thereby regulating the thickness and porosity thereof.

The coated metal tape can be employed to form anodes and/or cathodes for various types of electrolytic capacitors, such as wound capacitors or stacked capacitors.

The thickness of the metal tape 1 is intended to be within known ranges of from approximately 5 $\mu$m to approximately 300 $\mu$m. Each thermoplastic layer 2, 3 may have a thickness of between 5 $\mu$m and 80 $\mu$m, preferably about from 15 $\mu$m to 20 $\mu$m. Preferably the material of the coating layers 2, 3 has pores of a dimension approximately equal to the dimension of surface pores on surfaces 4 of metal tape 1 that result from etching treatment thereof during manufacture thereof. The diameter of such pores is in the range of approximately 1.5 $\mu$m to 5 $\mu$m for all voltages, and for low voltages in general and for capacitors with a very low impedance the diameter of such pores is less than 500 $\mu$m.

Although the present invention has been described and illustrated with regard to preferred features thereof, it is to be understood that various changes and modifications may be made to the specifically described and illustrated arrangements without departing from the scope of the present invention.

I claim:

1. An electrolytic capacitor comprising:

a cathode, an anode and a dielectric;

said anode comprising a first metal tape having opposite first and second surfaces and a thickness of from approximately 5 $\mu$m to approximately 300 $\mu$m;

said cathode comprising a second metal tape having opposite first and second surfaces and a thickness of from approximately 5 $\mu$m to approximately 300 $\mu$m;

said first and second metal tapes being spaced with said first surfaces thereof confronting each other;

at least one of said first and second metal tapes having rigidly adhered to at least said first surface thereof a sheet of microporous thermoplastic material forming a capacitor separating layer; and said dielectric comprising oxide films formed on said first and second surfaces of said first metal tape by oxidation thereof.

2. An electrolytic capacitor as claimed in claim 1, wherein said metal tapes comprise aluminum tapes.

3. An electrolytic capacitor as claimed in claim 1, wherein said sheet is welded to said at least said first surface.

4. An electrolytic capacitor as claimed in claim 1, wherein said sheet is cemented to said at least said first surface.

5. An electrolytic capacitor as claimed in claim 1, wherein said at least one of said first and second metal tapes has rigidly adhered to both said first and second surfaces thereof respective sheets of microporous thermoplastic material.

6. An electrolytic capacitor as claimed in claim 1, wherein both said first and second metal tapes have rigidly adhered to both said first and second surfaces thereof respective sheets of microporous thermoplastic material.

7. An electrolytic capacitor as claimed in claim 1, wherein both said first and second metal tapes have rigidly adhered to only one of said first and second surfaces thereof respective sheets of microporous thermoplastic material.

8. An electrolytic capacitor as claimed in claim 1, wherein said at least said first surface of said at least one of said first and second metal tapes that has said sheet rigidly adhered thereto has at least one uncovered region for use as a terminal contact.

9. An electrolytic capacitor as claimed in claim 1, wherein said at least said first surface of said at least one of said first and second metal tapes that has said sheet rigidly adhered thereto has surface pores resulting from etching treatment during formation, and said sheet has pores of approximately the same dimension as said surface pores.

10. An electrolytic capacitor as claimed in claim 9, wherein said pores have a diameter of less than approximately 500 $\mu$m.

11. An electrolytic capacitor as claimed in claim 9, wherein said pores have a diameter of approximately 1.5 $\mu$m to 5 $\mu$m.

12. An electrolytic capacitor as claimed in claim 1, wherein said thermoplastic material is polyethylene, polypropylene, polyester, polytetrafluoroethylene, polycabonate, polyamide 6, polyethyleneterephthalate, polyethylene isophthalate, a copolymer of polyethyleneterephthalate, or a copolymer of polyethylene isophthalate.

13. A method of manufacturing an electrolytic capacitor having a cathode, an anode and a dielectric, said method comprising:

providing as said anode a first metal tape having opposite first and second surfaces and a thickness of from approximately 5 $\mu$m to approximately 300 $\mu$m;

providing as said cathode a second metal tape having opposite first and second surfaces and a thickness of from approximately 5 $\mu$m to approximately 300 $\mu$m;

rigidly adhering to at least said first surface of at least one of said first and second metal tapes a sheet of microporous thermoplastic material;

positioning said first and second metal tapes spaced from each other with said first surfaces thereof confronting each other and with said sheet forming a capacitor separating layer therebetween; and oxidizing said first and second surfaces of said first metal tape and thereby forming thereon oxide layers as said dielectric.

14. A method as claimed in claim 13, further comprising, after said rigidly adhering, winding said at least one of said first and second metal tapes onto a supply roll, and controlling thickness and porosity of said sheet by regulation of said winding operation.

15. A method as claimed in claim 13, wherein said adhering comprises a thermal process.

16. A method as claimed in claim 13, wherein said adhering comprises welding said sheet to said at least said first surface.

17. A method as claimed in claim 13, wherein said adhering comprises cementing said sheet to said at least said first surface.

18. A method as claimed in claim 13, comprising rigidly adhering respective sheets of microporous thermoplastic material to both said first and second surfaces of said at least one of said first and second metal tapes.

19. A method as claimed in claim 13, comprising rigidly adhering respective sheets of microporous thermoplastic material to both said first and second surfaces of both said first and second metal tapes.

20. A method as claimed in claim 13, comprising rigidly adhering respective sheets of microporous thermoplastic material to only one of said first and second surfaces of both of said first and second metal tapes.

21. A method as claimed in claim 13, comprising maintaining uncovered at least one region of said at least said first surface of said at least one of said first and second metal tapes that has said sheet rigidly adhered thereto, and employing the thus uncovered region as a terminal contact.

22. A method as claimed in claim 13, further comprising forming surface pores resulting from etching treatment in said at least said first surface of said at least one of said first and second metal tapes that has said sheet rigidly adhered thereto, and providing said sheet with pores of approximately the same dimension as said surface pores.

23. A method as claimed in claim 22, wherein said pores have a diameter of less than approximately 500 $\mu$m.

24. A method as claimed in claim 22, wherein said pores have a diameter of approximately 1.5 $\mu$m to 5 $\mu$m.

25. A method as claimed in claim 13, wherein said metal tapes comprise aluminum tapes.

26. A method as claimed in claim 13, wherein said thermoplastic material comprises polyethylene, polypropylene, polyester, polytetrafluoroethylene, polycarbonate, polyamide 6, polyethyleneterephthalate, polyethylene isophthalate, a copolymer of polyethyleneterephthalate, or a copolymer of polyethylene isophthalate.

* * * * *